US010397482B2

(12) United States Patent
Takagi

(10) Patent No.: US 10,397,482 B2
(45) Date of Patent: Aug. 27, 2019

(54) IMAGING CONTROL APPARATUS AND METHOD FOR CONTROLLING THE SAME

(71) Applicant: CANON KABUSHIKI KAISHA, Tokyo (JP)

(72) Inventor: Yosuke Takagi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/846,873

(22) Filed: Dec. 19, 2017

(65) Prior Publication Data

US 2018/0184006 A1 Jun. 28, 2018

(30) Foreign Application Priority Data

Dec. 27, 2016 (JP) ................................ 2016-254225

(51) Int. Cl.

| | |
|---|---|
| ***H04N 5/232*** | (2006.01) |
| ***G03B 5/00*** | (2006.01) |
| ***G02B 15/14*** | (2006.01) |

(52) U.S. Cl.

CPC ..... *H04N 5/23293* (2013.01); *H04N 5/23212* (2013.01); *H04N 5/23216* (2013.01); (Continued)

(58) Field of Classification Search

CPC ........... H04N 5/23293; H04N 5/23216; H04N 5/225; H04N 5/23112; H04N 5/232945; H04N 5/23212; H04M 5/23216; H04B 5/232935; H04B 5/23296; G02B 15/14; G03B 5/00

USPC ............ 348/333.05, 333.09, 333.11, 333.01, 348/208.6, 211.9, 240.99, 240.1, 240.2, 348/240.3, 345, 347, 208.12, 326, 346; 396/79, 80, 82, 104, 121, 124, 150, 296, (Continued)

(56) References Cited

U.S. PATENT DOCUMENTS 8,208,056 B2 * 6/2012 Fujio ..................... H04N 5/232 348/333.12
8,704,856 B2 * 4/2014 Misawa .................. G09G 5/00 345/634

(Continued)

FOREIGN PATENT DOCUMENTS

JP 2012-060567 A 3/2012
JP 2016-163104 A 9/2016

*Primary Examiner* — Marly S Camargo

(74) *Attorney, Agent, or Firm* — Canon U.S.A., Inc. IP Division

(57) ABSTRACT

An imaging control apparatus includes a display control unit for performing control to present a 2-area enlargement display of displaying live view images captured at two imaging regions in an imaging unit that are separately arranged in a width direction or a height direction on a display unit, and a control unit for performing control to conduct an autofocus operation inside a range displayed in the 2-area enlargement display while maintaining the 2-area enlargement display in response to an autofocus instruction operation on a first operation unit in a state where the 2-area enlargement display is presented, and end the 2-area enlargement display and conduct the autofocus operation in a range independent of the inside the range displayed in the 2-area enlargement display in response to an autofocus instruction operation on a second operation unit in a state where the 2-area enlargement display is presented.

18 Claims, 7 Drawing Sheets

(52) U.S. Cl.
CPC ... *H04N 5/23296* (2013.01); *H04N 5/232935* (2018.08); *H04N 5/232945* (2018.08)

(58) Field of Classification Search
USPC ...... 396/379; 382/255; 345/173, 671, 472.2; 715/700
See application file for complete search history.

(56) References Cited

U.S. PATENT DOCUMENTS

| | | | | |
|---|---|---|---|---|
| 9,001,255 | B2 * | 4/2015 | Matsuzawaa ...... H04N 5/23212 348/0.01 | |
| 9,323,432 | B2 * | 4/2016 | Kang .................... G06F 3/0488 715/765 | |
| 10,015,404 | B2 | 7/2018 | Hara | |
| 2005/0319393 | * | 10/2005 | Sugimoto .............. H04N 5/222 348/333.01 | |
| 2007/0242143 | A1 | 10/2007 | Sugimoto | |
| 2007/0285534 | A1 * | 12/2007 | Makioka ................ H04N 5/262 348/240.99 | |
| 2008/0025712 | A1 | 1/2008 | Furuya | |
| 2012/0229675 | A1 | 9/2012 | Yamamoto | |
| 2013/0155308 | A1 | 6/2013 | Wu et al. | |
| 2013/0300674 | A1 | 11/2013 | Davidson | |
| 2014/0160233 | A1 | 6/2014 | Ishida | |
| 2015/0264253 | A1 | 9/2015 | Takagi | |
| 2016/0044235 | A1 | 2/2016 | Cho et al. | |
| 2016/0295130 | A1 | 10/2016 | Mølgaard et al. | |
| 2017/0034428 | A1 * | 2/2017 | Kwon ................. G06F 3/04817 348/211.13 | |
| 2017/0034449 | A1 | 2/2017 | Eum et al. | |
| 2017/0054913 | A1 * | 2/2017 | Hara .................. H04N 5/23293 348/240.2 | |
| 2017/0183996 | A1 * | 6/2017 | Baker et al. ....... H04N 5/23245 348/333.05 | |
| 2017/0199620 | A1 | 7/2017 | Ishitsuka | |
| 2017/0278217 | A1 * | 9/2017 | Takahashi ................. G06T 3/40 348/333.12 | |
| 2017/0318226 | A1 | 11/2017 | Jung et al. | |
| 2018/0013957 | A1 | 1/2018 | Irie et al. | |
| 2018/0184008 | A1 * | 6/2018 | Kondo ............... H04N 5/23293 348/333.01 | |
| 2018/0234630 | A1 * | 8/2018 | Kondo ............... H04N 5/23293 345/173 | |

* cited by examiner

IMAGING CONTROL APPARATUS AND METHOD FOR CONTROLLING THE SAME

BACKGROUND OF THE INVENTION

Field of the Invention

The present disclosure relates to, for example, a technique for displaying a live view image while enlarging a part thereof.

Description of the Related Art

When a camera is used, it may be desirable to capture an image while holding the camera horizontally in some cases. When, for example, a building or a scenery is imaged, failing to keep the camera horizontal results in a tilt of the captured image, thereby causing an awkward result. To solve this issue, Japanese Patent Application Laid-Open No. 2012-060567 discusses a method for detecting an orientation of the camera based on a direction of gravitational force that is detected by an acceleration sensor, and displaying a level display indicating the detected orientation of the camera together with a live-view image. Further, Japanese Patent Application Laid-Open No. 2016-163104 discusses a method for displaying images generated by enlarging two regions separated in a left/right direction on a live view image, respectively, side by side, thereby allowing a user to achieve accurate horizontal alignment by visual confirmation.

According to an apparatus discussed in Japanese Patent Application Laid-Open No. 2016-163104, when a shutter button is pressed to capture an image after the horizontal orientation is adjusted on a screen where the two regions are enlarged, the camera is focused within any of the enlarged two regions and the image is captured with the two regions kept enlarged. In this case, if a main subject is located at a position that is inside an imaging range but outside the enlarged regions, the user cannot capture the image while focusing the camera on this main subject and viewing this main subject.

SUMMARY OF THE INVENTION

The present disclosure is directed to an imaging control apparatus and an imaging control method allowing a user to capture an image of the main subject as desired after enlarging two-areas and adjusting the horizontal orientation.

According to an aspect of the present disclosure, an imaging control apparatus includes a display control unit configured to perform control to present a 2-area enlargement display of displaying live view images captured at two imaging regions in an imaging unit that are separately arranged in a width direction or a height direction on a display unit, and a control unit configured to perform control to conduct an autofocus operation inside of a range displayed in the 2-area enlargement display while maintaining the 2-area enlargement display in response to an autofocus instruction operation on a first operation unit in a state where the 2-area enlargement display is presented, and end the 2-area enlargement display and conduct the autofocus operation in a range independent of the inside of the range displayed in the 2-area enlargement display in response to an autofocus instruction operation on a second operation unit in a state where the 2-area enlargement display is presented.

Further features of the present disclosure will become apparent from the following description of exemplary embodiments with reference to the attached drawings.

DESCRIPTION OF THE EMBODIMENTS

An exemplary embodiment of the present disclosure will be described in detail below with reference to the accompanying drawings.

It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

Figure 1A:
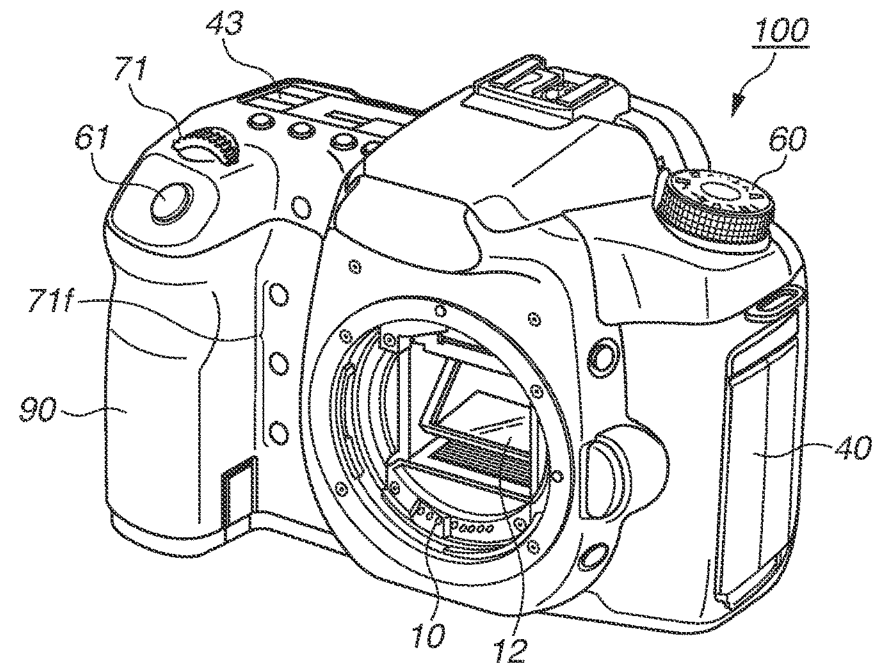
FIGS. 1A and 1B illustrate an external appearance of a digital camera.
Figure 1B:
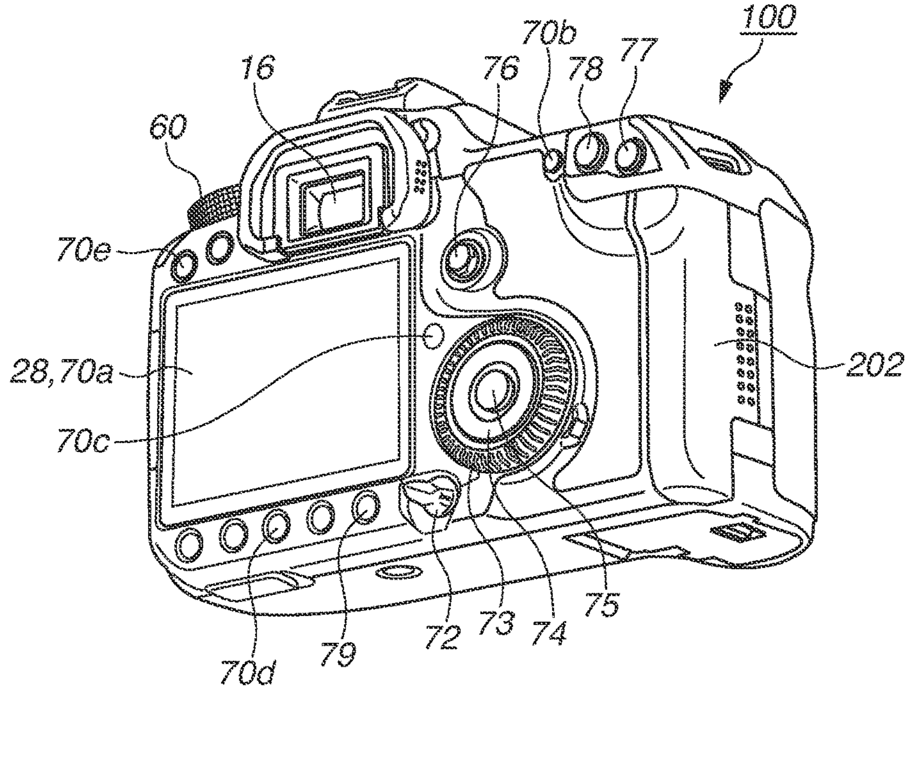

FIGS. 1A and 1B illustrate an external appearance of a digital camera 100 as one example of an apparatus to which the present disclosure can be applied. FIG. 1A is a perspective view of a front side of the digital camera 100, and FIG. 1B is a perspective view of a back side of the digital camera 100. In FIGS. 1A and 1B, a display unit 28 is a display unit provided on the back side of the digital camera 100 for displaying an image and various kinds of information. An out-finder display unit 43 is a display unit provided on a top surface of the camera 100, and displays various setting values of the camera 100 including a shutter speed and an aperture. A shutter button 61 is an operation member for issuing an imaging instruction. A mode selection switch 60 is an operation member for switching various kinds of modes. A terminal cover 40 is a cover for protecting a connector (not illustrated) to which a connector of a connection cable used for connecting an external apparatus to the digital camera 100 is attached. A main electronic dial 71 is a rotational operation member included in an operation unit 70, and a user can, for example, change the setting values, such as the shutter speed and the aperture value, by rotating this main electronic dial 71. A power switch 72 is an operation member for switching a power source of the digital camera 100 to ON or OFF. A sub electronic dial 73 is included in the operation unit 70, and is a rotational operation member included in the operation unit 70. The sub electronic dial 73 allows the user to, for example, move a selection frame and skip to a subsequent image (image forwarding operation). A cross key 74 is included in the operation unit 70, and is a cross key (a four-directional key) including an up portion, a down portion, a left portion, and a right portion that can be individually pressed. The cross key 74 allows the user to perform an operation according to the pressed portion. A SET button 75 is included in the operation unit 70, and is a pressing button. The SET button 75 is mainly used to, for example, determine a selected item.

A live view (LV) button 76 is included in the operation unit 70, and is a button for switching a live view (hereinafter referred to as an LV) to ON or OFF in a still image capturing mode. The LV button 76 is used to instruct the digital camera 100 to start or stop capturing (recording) a moving image in a moving image capturing mode. An enlargement button 77 is included in the operation unit 70, and is an operation button for switching an enlargement mode to ON or OFF in a live view display in an imaging mode, and changing an enlargement ratio in an enlargement mode. The enlargement button 77 functions as an enlargement button for enlarging a playback image and increasing the enlargement ratio in a playback mode. A reduction button 78 is included in the operation unit 70, and is a button for reducing the enlargement ratio of the enlarged playback image to reduce the size of the displayed image. A playback button 79 is included in the operation unit 70, and is an operation button for switching the imaging mode and the playback mode. Pressing the playback button 79 while the digital camera 100 is in the imaging mode causes the digital camera 100 to transition to the playback mode, and allows the digital camera 100 to display the latest image among images recorded in a recording medium 200 on the display unit 28. A quick-return mirror 12 is instructed by a system control unit 50 to be flipped up and down by an actuator (not illustrated). A communication terminal 10 is a communication terminal used for the digital camera 100 to communicate with a lens side (attachable to and detachable from the digital camera 100). An eyepiece finder 16 is a finder configured to be looked into, which is usable to confirm a focus and a composition of an optical image of a subject that is acquired via a lens unit 150 by observing a focusing screen 13. A cover 202 is a cover of a slot where the recording medium 200 is stored. A grip portion 90 is a holding portion shaped so as to allow the user to easily grip it with the user's right hand when holding the digital camera 100.

Figure 2:
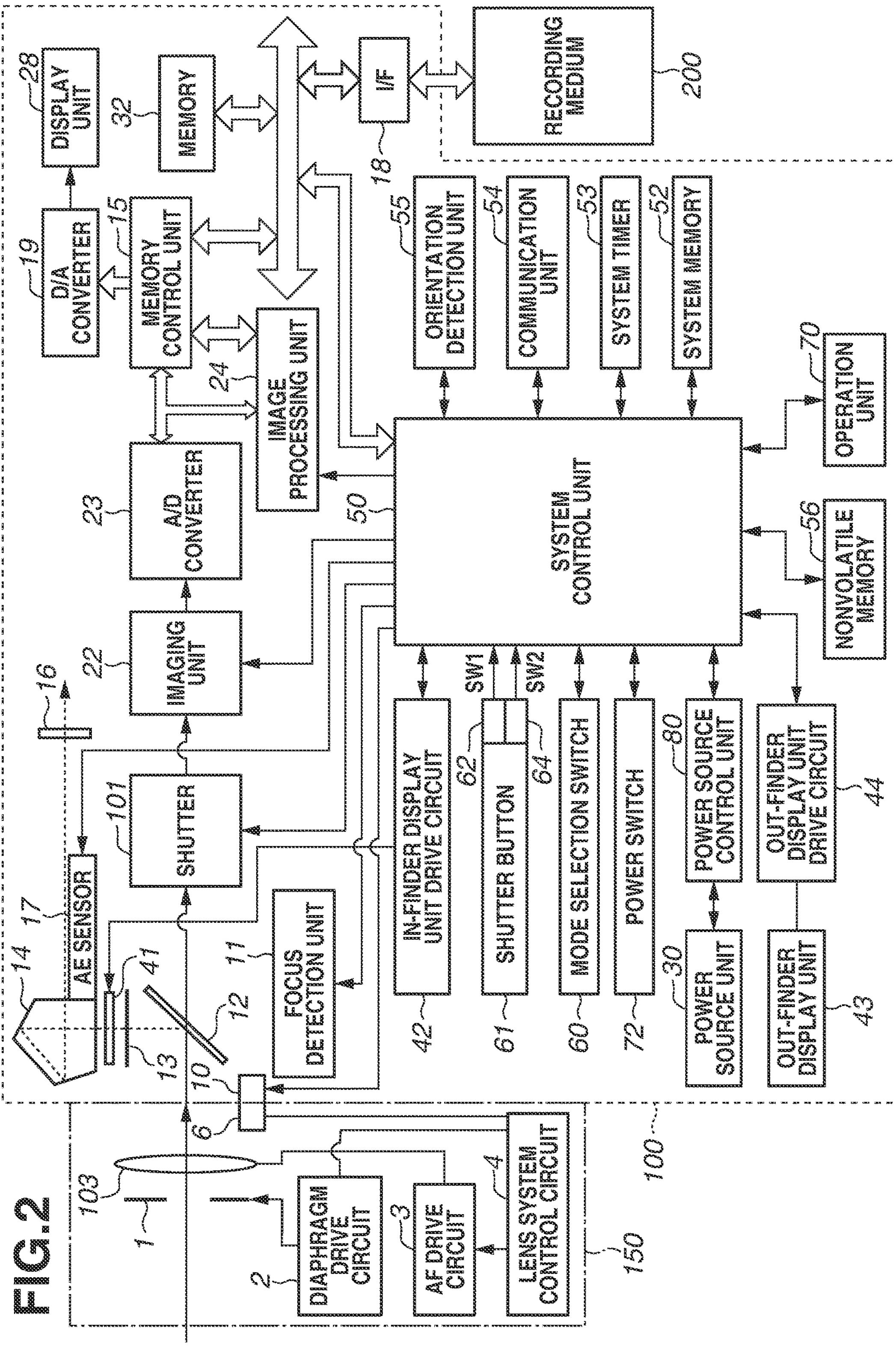
FIG. 2 is a block diagram illustrating a configuration of the digital camera.

FIG. 2 is a block diagram illustrating an example of a configuration of the digital camera 100 according to the present exemplary embodiment.

In FIG. 2, the lens unit 150 is a lens unit with a replaceable imaging lens mounted thereon.

A lens 103 is normally formed of a plurality of lenses, but is illustrated as being only one lens in FIG. 2 for the purpose of simplification. A communication terminal 6 is a communication terminal used for the lens unit 150 to communicate with the digital camera 100 side, and the communication terminal 10 is the communication terminal used for the digital camera 100 to communicate with the lens unit 150 side. The lens unit 150 allows the digital camera 100 to be focused by communicating with the system control unit 50 via these communication terminals 6 and 10, controlling a diaphragm 1 via a diaphragm drive circuit 2 by an internally provided lens system control circuit 4, and displacing a position of the lens 103 via an autofocus (AF) drive circuit 3.

An automatic exposure (AE) sensor 17 measures light to detect a luminance of the subject that is acquired via the lens unit 150.

A focus detection unit 11 outputs defocus amount information to the system control unit 50. The system control unit 50 controls the lens unit 150 based on this defocus amount information to conduct phase difference AF.

The quick-return mirror 12 (hereinafter referred to as mirror 12) is instructed by the system control unit to be flipped up and down by the actuator (not illustrated) at the time of an exposure, capturing an image for the live view, and capturing a moving image. The mirror 12 is a mirror for switching a light flux incident from the lens 103 between a finder 16 side and an imaging unit 22 side. The mirror 12 is disposed so as to reflect the light flux to guide the light flux to the finder 16 at a normal state. However, when the image is captured or the live view is displayed, the mirror 12 is flipped up so as to guide the light flux to the imaging unit 22, thereby being retracted from inside the light flux (mirror lock-up). Further, the mirror 12 is configured as a half mirror at a central portion thereof so as to permit the light to be partially transmitted therethrough, and allows the light flux to be partially transmitted therethrough so as to be incident on the focus detection unit 11 for carrying out focus detection.

The user of the digital camera 100 can confirm the focus and the composition of the optical image of the subject acquired via the lens unit 150 by observing the focusing screen 13 via a pentaprism 14 and the finder 16.

A shutter 101 is a focal plane shutter capable of freely controlling an exposure time period of the imaging unit 22 under control by the system control unit 50.

The imaging unit 22 is an image sensor constituted with use of, for example, a charge coupled device (CCD) or complementary metal-oxide semiconductor (CMOS) element, which converts an optical image into an electric signal. An analog-to-digital (A/D) converter 23 converts an analog signal into a digital signal. The A/D converter 23 is used to convert an analog signal output from the imaging unit 22 into a digital signal.

An image processing unit 24 performs predetermined pixel interpolation, resizing processing such as a reduction, and color conversion processing on the data received from the A/D converter 23 or data from a memory control unit 15. Further, the image processing unit 24 performs predetermined calculation processing with use of the captured image data, and the system control unit 50 controls the exposure and ranging based on an acquired result of the calculation. Based on this control, the digital camera 100 performs AF processing, AE processing, and flash preliminary emission (EF) processing of the Through-The-Lens (TTL) method. The image processing unit further performs predetermined calculation processing with use of the captured image data, and the digital camera 100 also performs automatic white balance (AWB) processing of the TTL method based on an acquired result of the calculation.

The output data from the A/D convertor 23 is written into a memory 32 via the image processing unit 24 and the memory control unit 15, or is directly written into the memory 32 via the memory control unit 15. The memory 32 stores the image data acquired by the imaging unit 22 and converted into the digital data by the A/D converter 23, and image data to be displayed on the display unit 28. The memory 32 has a storage capacity sufficient to store a predetermined number of still images, or a moving image and audio data for a predetermined time period.

Further, the memory 32 also serves as a memory for the image display (a video memory). A digital-to-analog (D/A) converter 19 converts the data for the image display that is stored in the memory 32 into an analog signal, and provides the converted data to the display unit 28. In this manner, the image data for the display that is written in the memory 32 is displayed by the display unit 28 via the D/A converter 19. The display unit 28 presents a display according to the analog signal from the D/A converter 19 on a display device, such as a liquid crystal display (LCD). The digital camera 100 can provide a function as an electronic viewfinder and realize a through-image display (live view display) by converting the digital signal that has been converted from the analog signal by the A/D converter 23 and then stored into the memory 23 into the analog signal by the D/A converter 19, sequentially transferring the analog signal to the display unit 28 to display the transferred analog signal.

A frame indicating a focusing point on which the autofocus is currently conducted (AF frame), an icon indicating a setting state of the camera 100, and the like are displayed on an in-finder liquid crystal display unit 41 via an in-finder display unit drive circuit 42.

The various setting values of the camera 100 including the shutter speed and the aperture value are displayed on the out-finder display unit 43 via an out-finder display unit drive circuit 44.

A nonvolatile memory 56 is an electrically erasable and recordable memory, and, for example, an electrically erasable programmable read only memory (EEPROM) is used as the nonvolatile memory 56. The nonvolatile memory 56 stores constants, programs, and the like for operating the system control unit 50. The programs described here refer to programs for performing various kinds of flowcharts that will be described below in the present exemplary embodiment.

The system control unit 50 is a control unit including at least one processor, and controls the entire digital camera 100. The system control unit 50 realizes each processing procedure in the present exemplary embodiment (described below) by executing the above-described programs recorded in the nonvolatile memory 56. The digital camera 100 further includes a system memory 52, and, for example, a random access memory (RAM) is used as the system memory 52. The constants and variables for operating the system control unit 50, the programs read out from the nonvolatile memory 56, and the like are loaded into the system memory 52. Further, the system control unit 50 also performs display control by controlling the memory 32, the D/A converter 19, the display unit 28, and the like.

A system timer 53 is a time measurement unit that measures a time period for use in various kinds of control, and a time of a built-in clock.

The mode selection switch 60, a first shutter switch 62, a second shutter switch 64, and the operation unit 70 are operation units for inputting various kinds of operation instructions to the system control unit 50.

The mode selection switch 60 switches an operation mode of the system control unit 50 to any of a still image recording mode, the moving image capturing mode, the playback mode, and the like. Modes contained in the still image recording mode include an automatic imaging mode, an automatic scene determination mode, a manual mode, an aperture priority mode (aperture value (Av) mode), and a shutter speed priority mode (time value (Tv) mode). Further, the modes contained in the still image recording mode include various kinds of scene modes each corresponding to an imaging setting prepared for each imaging scene, a program AE mode, a custom mode. The user can directly switch the operation mode to any of these modes with use of the mode selection switch 60. Alternatively, the user may first switch the digital camera 100 to a screen displaying a list of the imaging modes with use of the mode selection switch 60, and, after that, select any of the plurality of displayed modes and switch the operation mode with use of another operation member. Similarly, the moving image capturing mode may also include a plurality of modes.

The first shutter switch 62 is switched on halfway through an operation of the shutter button 61, which is an imaging operation member provided on the digital camera 100, i.e., switched on upon a so-called half-press of the shutter button 61 (a first operation/instruction to prepare to capture the image), and generates a first shutter switch signal SW1. In response to the first shutter switch signal SW1, the system control unit 50 starts an operation of imaging preparation processing, such as the AF processing, the AE processing, the AWB processing, and the EF processing.

The second shutter switch 64 is switched on upon completion of the operation of the shutter button 61, i.e., switched on upon a so-called full-press of the shutter button 61 (a second operation/instruction to capture the image), and generates a second shutter switch signal SW2. In response to the second shutter switch signal SW2, the system control unit 50 starts a series of imaging processing operations from reading out the signal from the imaging unit 22 to writing the image data into the recording medium 200.

The individual operation members of the operation unit 70 are appropriately assigned functions for each scene and work as various kinds of functional buttons, by, for example, execution of an operation for selecting various kinds of functional icons displayed on the display unit 28. Examples of the functional buttons include an end button, a return button, an image forwarding button, a jump button, a depth-of-field preview button, and an attribute change button. For example, when a menu button 70*e* is pressed, a menu screen where various kinds of settings can be made is displayed on the display unit 28. The user can intuitively make the various kinds of settings by using the menu screen displayed on the display unit 28, the "up, down, left, and right four-directional button" 74, and the SET button 75.

The operation unit 70 includes various kinds of operation members as an input unit that receives an operation from the user. The operation unit 70 includes at least the following operation units: the shutter button 61, the main electronic dial 71, the power switch 72, the sub electronic dial 73, the cross key 74, the SET button 75, the LV button 76, the enlargement button 77, the reduction button 78, and the playback button 79. The cross key 74 is a directional button that allows each of the up, down, right, and left portions of the cross key 74 to be pressed in. In the present exemplary embodiment, the cross key 74 has been described as an integrated operation unit, but each of the up button, the down button, the right button, and the left button may be an independent button. In the following description, the up or down portion, and the left or right portion will be referred to as an up/down key and a left/right key, respectively. Further, the operation unit 70 also includes the following operation units.

An AF-ON button 70*b* is a pressing button switch included in the operation unit 70, and the user can instruct the digital camera 100 to conduct the AF operation by pressing the AF-ON button 70*b*. The AF-ON button 70*b* is pressed in a direction parallel with a direction (optical axis) of subject light incident from the lens 103 on the imaging unit 22.

A quick setting button 70*c* (hereinafter referred to as a Q button 70*c*) is a pressing button switch included in the operation unit 70, and a quick setting menu, which is a list of setting items settable in each operation mode, is displayed by pressing the Q button 70*c*. For example, when the Q button 70*c* is pressed while the digital camera 100 is on standby for the imaging in the live view imaging, a list of setting items such as an electronic front curtain shutter, brightness of a monitor, WB of an LV screen, a 2-area enlargement, and silent imaging is displayed in one row in a state of being superimposed on the LV. The user can change a setting regarding a selected setting item and transition to an operation mode by selecting an arbitrary option in the displayed quick setting menu with use of the up/down key and pressing the SET button 75.

An active frame switching button 70*d* is a pressing button switch included in the operation unit 70, and the user can switch an active enlarged position (frame) between two enlarged portions by pressing the active frame switching button 70*d* in 2-area enlargement processing (2-area zooming processing), which will be described below. Further, a different function is assigned thereto depending on the operation mode, and the user can add a protected attribute to a displayed image by pressing this button in the playback mode.

The menu button 70*e* is a pressing button switch included in the operation unit 70, and the menu screen where the various kinds of settings can be made is displayed on the display unit 28.

Functional buttons 70*f* are three pressing button switches included in the operation unit 70, and a function is assigned to each of them. Each of the functional buttons 70*f* is disposed at a position that allows a finger (middle finger, ring finger, or little finger) of the right hand holding the grip portion 90 to operate the functional button 70*f*, and is pressed in the direction parallel with the direction (optical axis) of the subject light incident from the lens 103 on the imaging unit 22.

A power source control unit 80 includes a battery detection circuit, a direct-current-to-direct-current (DC-DC) converter, a switching circuit that switches a block to which power is supplied, and detects whether a battery is mounted, a type of the battery, and a remaining battery level. Further, the power source control unit 80 controls the DC-DC converter and supplies a required voltage to each of the units including the recording medium 200 for a required time period based on a result of this detection and an instruction from the system control unit 50.

A power source unit 30 includes a primary battery such as an alkaline battery and a lithium battery, a secondary battery such as a nickel-cadmium (NiCd) battery, a nickel metal hydride (NiMH) battery, and a lithium (Li) battery, an alternating-current (AC) adapter. A recording medium interface (I/F) 18 is an interface with the recording medium 200, such as a memory card and a hard disk. The recording medium 200 is a recording medium for recording the captured image, such as a memory card, and is constructed with use of a semiconductor memory, a magnetic disk, or the like.

A communication unit 54 is connected wirelessly or via a cable for a wired connection, and transmits and receives a video signal and an audio signal. The communication unit 54 can also be connected to a wireless local area network (LAN) or the Internet. The communication unit 54 can transmit the image captured by the imaging unit 22 (including the through-image) and the image recorded in the recording medium 200, and, further, can receive image data and other various kinds of information from an external apparatus.

An orientation detection unit 55 detects an orientation of the digital camera 100 with respect to a direction of gravitational force. It can be determined whether the image captured by the imaging unit 22 is an image captured with the digital camera 100 held in a landscape orientation or an image captured with the digital camera 100 held in a portrait orientation based on the orientation detected by the orientation detection unit 55. The system control unit 50 can add orientation information according to the orientation detected by the orientation detection unit 55 to an image file of the image captured by the imaging unit 22, and record the image after rotating the image. An acceleration sensor, a gyroscope sensor, or the like can be used as the orientation detection unit 55.

The digital camera 100 includes the touch panel 70*a* that can detect a touch on the display unit 28 as one element of the operation unit 70. The touch panel 70*a* and the display unit 28 can be configured integrally with each other. For example, the touch panel 70*a* is configured in such a manner that an optical transmittance thereof does not disturb the display on the display unit 28, and is mounted on an upper layer of a display surface of the display unit 28. Then, an input coordinate on the touch panel 70*a* and a display coordinate on the display unit 28 are associated with each other. This configuration can construct a graphical user interface (GUI) that appears as if the user can directly operate a screen displayed on the display unit 28. The system control unit 50 can detect the following operations on the touch panel 70*a* or states of the touch panel 70*a*.

A finger or a pen that has not touched the touch panel 70*a* newly touches the touch panel 70*a*. In other words, the touch is started (hereinafter referred to as a Touch-Down).

The touch panel 70*a* is being touched by the finger or the pen (hereinafter referred to as a Touch-On).

The finger or the pen is being moved while keeping touching the touch panel 70*a* (hereinafter referred to as a Touch-Move).

The finger or the pen that has been in touch with the touch panel 70*a* is separated from the touch panel 70*a*. In other words, the touch is ended (hereinafter referred to as a Touch-Up).

The touch-panel 70*a* is not touched by the finger or the pen (hereinafter referred to as a Touch-Off).

When the Touch-Down is detected, a start of the Touch-On is also detected at the same time. After the Touch-Down, the detection of the Touch-On normally continues unless the Touch-Up is detected. The Touch-Move is detected in a state where the Touch-On is also detected. Even when the Touch-On is detected, the Touch-Move is not detected unless a touched position is being moved. After detection of the Touch-Up of all of the fingers (finger) or the pens (pen) that have been in touch with the touch panel 70*a*, the touch panel 70*a* transitions to the Touch-Off.

The system control unit 50 is notified of these operations/states and a coordinate of the position touched by the finger or the pen on the touch panel 70*a* via an internal bus, and determines what kind of touch operation is performed on the touch panel 70*a* based on the information that the system control unit 50 is notified of. Regarding the Touch-Move, the system control unit 50 can also determine a movement direction of the finger or the pen being moved on the touch panel 70*a* based on a change in the coordinate of the position for each of a vertical component and a horizontal component on the touch panel 70*a*. Assume that the system control unit 50 determines that a slide operation is performed when detecting that the Touch-Move is performed by a predetermined distance or longer. An operation of quickly moving the finger only by a certain distance while keeping the finger in touch on the touch panel 70*a*, and separating the finger from the touch panel 70*a* directly therefrom will be referred to as a flick. In other words, the flick is an operation of quickly running the finger on the touch panel 70*a* as if flicking on the touch panel 70*a* with the finger. The system control unit 50 can determine that the flick is performed when detecting that the Touch-Move is performed by a predetermined distance or longer at a predetermined speed or higher and detecting the Touch-Up directly therefrom (can determine that the flick is performed subsequently to the slide operation). Further, a touch operation of touching a plurality of portions (e.g., 2-areas) at the same time and moving the respective touched positions toward each other will be referred to as a pinch-in, and a touch operation of moving the respective touched positions away from each other will be referred to as a pinch-out. The pinch-in and the pinch-out will be collectively referred to as a pinch operation (or simply a pinch). The touch panel 70*a* may be embodied by employing any type of touch panel among touch panels based on various methods, such as a resistive film method, a capacitive method, a surface acoustic wave method, an infrared method, an electromagnetic induction method, an image recognition method, and an optical sensor method. Employable detection methods include a method that detects that the touch is input when the touch panel 70*a* is touched, and a method that detects that the touch is input when the finger or the pen just approaches the touch panel 70*a*, depending the type of the touch panel 70*a*, and the touch panel 70*a* may be embodied by employing any method of them.

Figure 3:
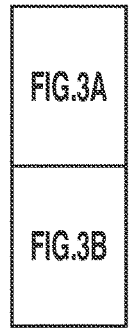
FIG. 3 (consisting of FIGS. 3A and 3B) is a flowchart illustrating imaging mode processing.
Figure 3A:
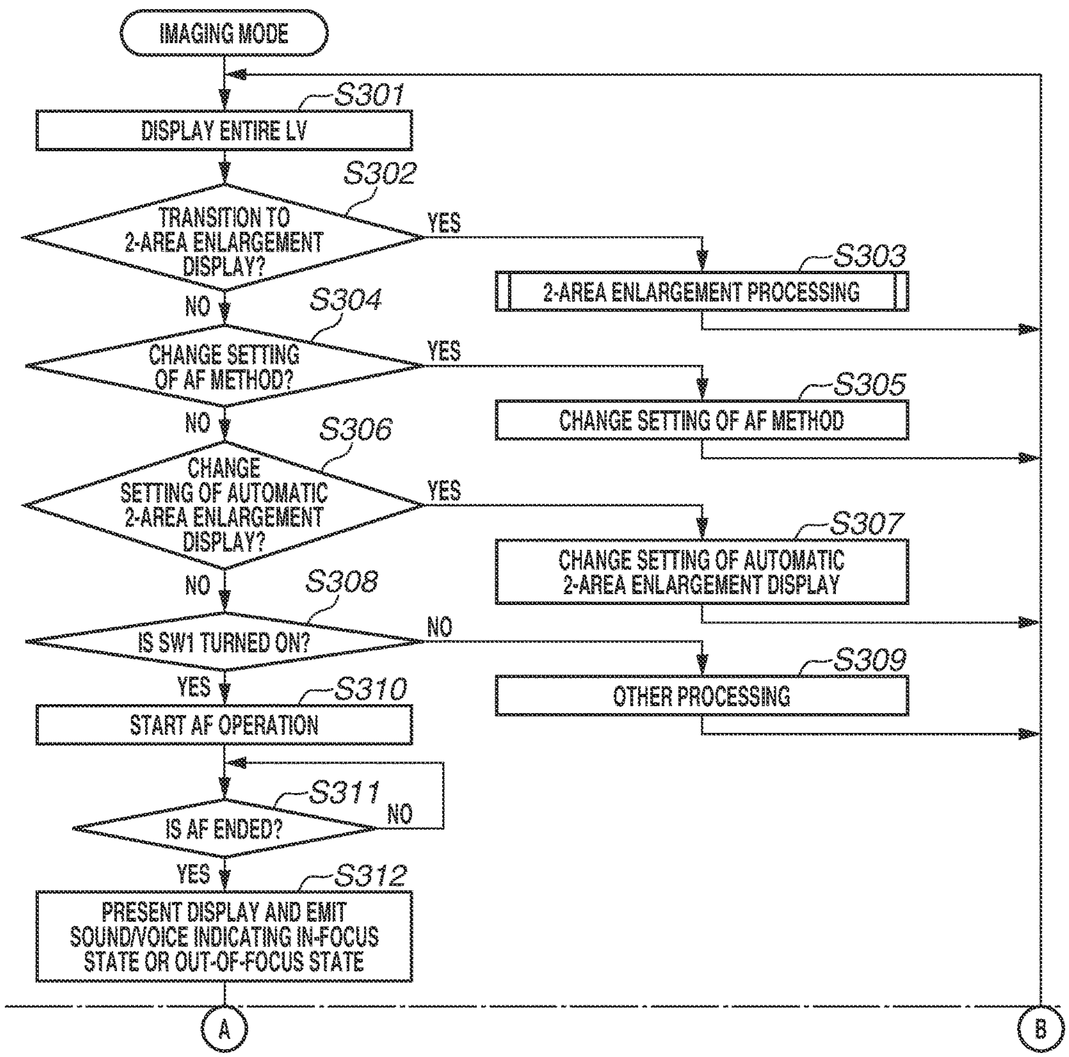
Figure 3B:
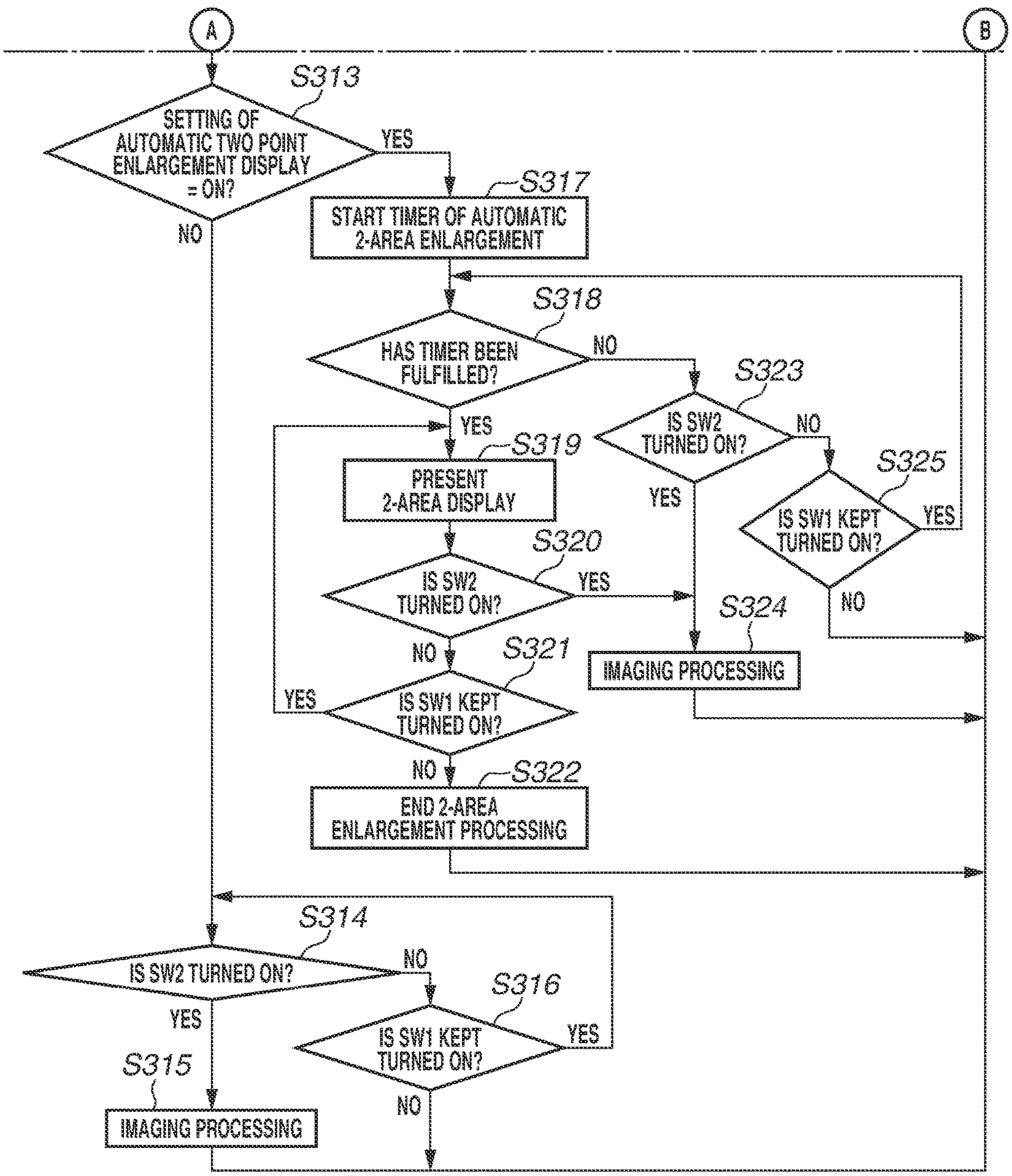

FIG. 3 (consisting of FIGS. 3A and 3B) is a flowchart illustrating a flow of processing while the digital camera 100 is on standby for the imaging. The program recorded in the nonvolatile memory 56 is loaded into the system memory 52 and executed by the system control unit 50, by which this processing is realized. When the digital camera 100 is started up in the imaging mode and the live view imaging is turned on, the processing illustrated in FIG. 3 is started.

Figure 5A:
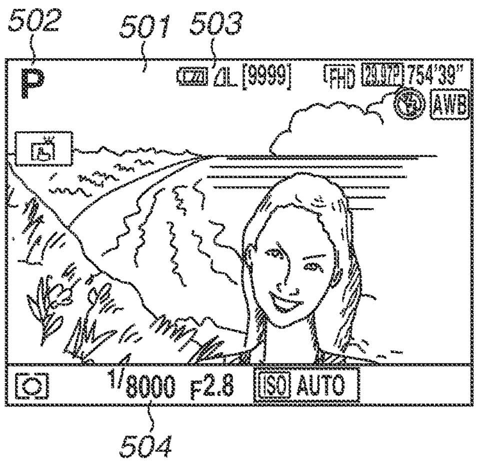
FIGS. 5A to 5E illustrate display examples in the imaging mode processing.
Figure 5D:
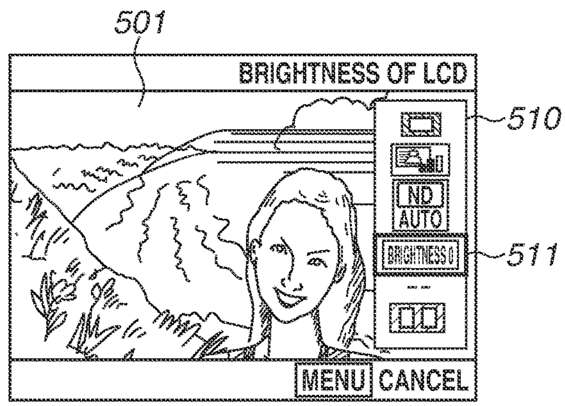
Figure 5B:
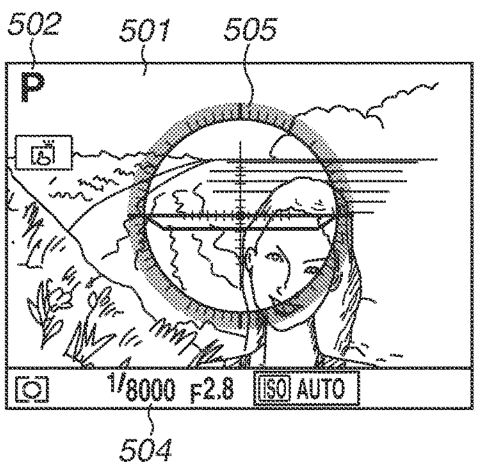

In step S301, the system control unit 50 displays an imaging standby screen on the display unit 28. FIG. 5A illustrates a display example of the imaging standby screen. A live view (LV) image 501 indicating an entire imaging range is displayed on the imaging standby screen. Further, an icon 502 indicating a current imaging mode and an information display 503 regarding the imaging settings are displayed in a superimposed state on the LV image 501. FIG. 5B illustrates a display example of other information on the imaging standby screen. Displaying a level 505 superimposed on the live view image 501 allows the user to roughly establish horizontality of the camera 100. The level 505 is an electronic level indicating an orientation of the digital camera 100 with respect to the direction of gravitational force that is detected by the orientation detection unit 55. The level 505 indicates a tilt of a left/right direction of the digital camera 100 (left/right direction of the imaging unit 22) with respect to a direction (horizontal direction) perpendicular to the direction of gravitational force. The user can acquire a horizontal image by adjusting the orientation of the digital camera 100 in such a manner that this tilt reduces to zero while viewing the level 505. Further, the level 505 indicates an elevation angle or a depression angle, which is an orientation of the optical axis direction of the digital camera 100 (direction in which the subject light is incident on the imaging unit 22) with respect to the direction (horizontal direction) perpendicular to the direction of gravitational force. The display state illustrated in FIG. 5A and the display state illustrated in FIG. 5B can be switched in response to the pressing of an information switching button (INFO button) included in the operation unit 70. Further, assume that the display can be also switched to a display state in a state where the live view image 501 is displayed but the icon 502, the information display 503 regarding the imaging settings, and information 504 regarding the exposure being hidden in response to the pressing of the information switching button.

In step S302, the system control unit 50 determines whether an instruction operation for transitioning to a 2-area enlargement display is performed. The instruction operation for transitioning to the 2-area enlargement display is an operation for displaying the quick setting menu, selecting the item indicating the 2-area enlargement included in the quick setting menu, and entering this selection. More specifically, when the Q button 70*c* is pressed on the displayed imaging standby screen, a quick setting screen is displayed on the display unit 28. FIG. 5D illustrates a display example of the quick setting menu. A quick setting menu 510 is displayed in a superimposed state on the live view image 501. On the quick setting menu 510, a group of icons each representing a different item is arranged, and a cursor 511 is displayed on an icon set into a selected state. The cursor 511 can be moved by an up/down operation on the cross key 74. When the SET button 75 is pressed with the cursor 511 placed on the icon representing the item indicating the 2-area enlargement from among the plurality of items displayed on the quick setting menu 510 (state illustrated in FIG. 5E), the system control unit 50 determines that the instruction operation for transitioning to the 2-area enlargement display is performed. If the instruction operation for transitioning to the 2-area enlargement display is performed (YES in step S302), the processing proceeds to step S303 and the system control unit 50 performs the 2-area enlargement processing. Details of the 2-area enlargement processing will be described below with reference to FIG. 4. If the instruction operation for transitioning to the 2-area enlargement display is not performed (NO in step S302), the processing proceeds to step S304.

In step S304, the system control unit 50 determines whether an operation for changing a setting of an AF method is performed. If the operation for changing the setting of the AF method is performed (YES in step S304), the processing proceeds to step S305. If not (NO in step S304), the processing proceeds to step S306. In step S305, the system control unit 50 changes and sets the AF method (i.e., stores the AF method into the system memory or the nonvolatile memory 56) based on the operation from the user that has been detected in step S304. In the present exemplary embodiment, assume that the AF can be set to any of the following methods as the AF method.

Single-point Method (Single-point AF): This method is a method that focuses the digital camera 100 on an arbitrary AF position specified by the user in the live view display of the entire imaging range. An initial setting is a center, and the AF is conducted with respect to a central single point in the live view display if the user does not perform an operation for specifying the AF position (central single-point AF).

Artificial Intelligence (Ai)-AF method: This method is a method that evaluates the live view image of the entire imaging range overall, determines an optimum subject (main subject), and focuses the digital camera 100 thereon. A subject located close to the camera 100, a subject having high contrast, a moving subject, a subject located close to the center of the imaging range, or the like is prioritized to be weighted as the main subject on which the digital camera 100 is focused, and the main subject is automatically determined.

Face AF (Face Priority AF and Face+Tracking Priority AF): This method is a method that detects a human face from the live view image and focuses the digital camera 100 on the face as the main subject. If no human face is detected, the main subject is determined in a similar manner to the Ai-AF. If a plurality of human faces is detected, a person registered with the digital camera 100 or the like is prioritized to be weighted in addition to similar weighting to the Ai-AF, and a face to be handled as the main subject is determined. When the AF method is set to the face AF, a face frame indicating the detected face is displayed in a superimposed manner on the live view image on the imaging standby screen. Even while the digital camera 100 is on standby for the imaging, the face frame is placed on the face set as the main subject, and the AF is continuously conducted even without the instruction operation for the AF such as SW1 being issued (continuous AF). Further, if an operation for specifying a position on the live view is performed by the user with the touch operation or the like, the continuous AF is conducted in a state of setting the subject located at the specified position as the main subject and tracking this subject. If a face is detected around the specified position, this face is tracked as the main subject. If no face is detected within a predetermined range from the specified position, the continuous AF is conducted in a state of tracking a subject other than the face located at the specified position based on information such as contrast and a color of the specified position (object tracking). If no face is detected and nothing is tracked either, the main subject is determined in a similar manner to the Ai-AF method, and the AF is conducted with respect to the main subject.

Zone AF: This method is a method that divides the entire imaging range into three zones of a right side, a center, and a left side, and determines the face to be handled as the main subject in a zone specified by the user from the three zones with use of similar weighting to the Ai-AF method.

In step S306, the system control unit 50 determines whether an operation for changing a setting of an automatic 2-area enlargement display is performed. The setting of the automatic 2-area enlargement display is assumed to be able to be changed by selecting and operating a menu item indicating the setting of the automatic 2-area enlargement display on a menu screen displayed when the menu button 70*e* is pressed. The user can select and set any of enable (ON) and disable (OFF) as the setting of the automatic 2-area enlargement display. Assume that an initial setting is the disable (OFF). If the instruction operation for changing the setting of the automatic 2-area enlargement display (operation for causing the menu screen to be displayed, selecting the menu item indicating the setting of the automatic 2-area enlargement display, and selecting the enable or the disable) is performed (YES in step S306), the processing proceeds to step S307. If not (NO in step S306), the processing proceeds to step S308. In step S307, the system control unit 50 changes and sets the setting of the automatic 2-area enlargement display in response to the instruction operation for changing the setting of the automatic 2-area enlargement display. The set information is recorded into the system memory 52 or the nonvolatile memory 56.

In step S308, the system control unit 50 determines whether the shutter button 61 is half pressed and SW1 is turned on. If SW1 is turned on (YES in step S308), the processing proceeds to step S310. If not (NO in step S308), the processing proceeds to step S309.

In step S309, the system control unit 50 performs other processing. Examples of other processing include changing various kinds of imaging settings (e.g., aperture value, shutter speed, exposure correction, image quality setting, ON/OFF of self-timer imaging, ON/OFF of the flash) according to the operation, and switching the display according to an operation on the above-described information switching button (INFO button).

In step S310, the system control unit 50 conducts the AF operation although, if the continuous AF is ongoing, the AF has been being conducted since before step S310. Further, the system control unit 50 performs the imaging preparation processing such as the AE according to the setting in addition to the AF. In step S311, the system control unit 50 determines whether the AF operation is ended. If the AF operation is ended (YES in step S311), the processing proceeds to step S312. In step S312, the system control unit 50 displays a result of the execution of the AF operation. More specifically, if the digital camera 100 is focused as a result of the AF operation, an in-focus frame is displayed on the main subject as a display at the time of an AF in-focus state. The in-focus frame is different from the above-described face frame displayed while the digital camera 100 is on standby for the imaging, in a display manner such as a color, and is a frame presented in a manner that allows the user to be aware that this is the in-focus frame. Further, a speaker (not illustrated) is caused to emit a sound/voice indicating that the digital camera 100 is focused (in-focus sound/voice). If the digital camera 100 has failed to be focused (i.e., out of focus state), an out-of-focus frame different from the in-focus frame is displayed, and the speaker (not illustrated) is caused to emit a sound/voice indicating that the digital camera 100 is not focused.

In step S313, the system control unit 50 refers to setting information about the setting of the automatic 2-area enlargement display recorded in the system memory 52 or the nonvolatile memory 56, and determines whether the setting of the automatic 2-area enlargement display is set to ON (enable). If the setting of the automatic 2-area enlargement display is set to ON (YES in step S313), the processing proceeds to step S317. If not (if the setting of the automatic 2-area enlargement display is set to the disable) (NO in step S313), the processing proceeds to step S314.

In step S314, the system control unit 50 determines whether the shutter button 61 is fully pressed and SW2 is turned on. If SW2 is turned on (YES in step S314), the processing proceeds to step S315. If not (NO in step S314), the processing proceeds to step S316. In step S315, the system control unit 50 performs the above-described imaging processing (series of imaging processing operations from reading the signal from the imaging unit 22 to writing the image file into the recording medium 200) in response to SW2 being turned on. If a quick review is set to ON, the system control unit 50 automatically displays a newly captured image on the display unit 28 for a predetermined time period after the imaging processing, thereby allowing the user to confirm the imaging. After the imaging processing is ended, the processing returns to step S301. In step S316, the system control unit 50 determines whether the shutter button 61 is kept in the half-pressed state (SW1 is kept in the ON state). If SW1 is kept turned on (YES in step S316), the processing proceeds to step S314. If SW1 is not kept turned on, i.e., the shutter button 61 is released from the half-pressed state (NO in step S316), the processing returns to step S301.

In step S317, the system control unit 50 starts a timer for measuring a time period since the processing in step S312 until an automatic transition to the automatic 2-area enlargement. Assume that this timer is set to two seconds in the present exemplary embodiment. However, it is not limited to two seconds, and may be another time period within approximately several hundred milliseconds to several seconds. Further, the user may be able to set an arbitrary time period in advance as the setting regarding the automatic 2-area enlargement display setting.

In step S318, the system control unit 50 determines whether the timer for measuring the time period until the automatic transition to the automatic 2-area enlargement has been fulfilled (i.e., predetermined time period of two seconds has elapsed). If the timer has been fulfilled (YES in step S318), the processing proceeds to step S319. If not (NO in step S318), the processing proceeds to step S323.

In step S319, the system control unit 50 presents the 2-area enlargement display on the display unit 28. In the 2-area enlargement, live view images of two regions separated in a left/right direction (horizontal direction or width direction) or an up/down direction (vertical direction or height direction) are displayed in a state of being arranged on one screen. This display manner is similar to that in step S401, which will be described below. Details of the 2-area enlargement display will be described below with reference to a flowchart illustrated in FIG. 4 and FIGS. 5A to 5E. Regarding an enlarged position (display range) and an enlargement ratio, assume that the 2-area enlargement display is presented according to an enlarged position (display range) and an enlargement ratio prepared as initial settings if the 2-area enlargement display processing in step S303 has not been performed after the transition to the imaging mode. Assume that the 2-area enlargement display is presented according to the same enlarged position (display range) and enlargement ratio as the 2-area enlargement processing performed last if being presented after the 2-area enlargement processing in step S303 has been performed after the transition to the imaging mode. The 2-area enlargement display in step S319 is a temporary display that is ended once SW1 is released from the held state. Therefore, the 2-area enlargement display may be presented as a display without an active frame, which will be described below, being displayed and any of a left-side region 601 and a right-side region 602 being selected. Further, the system control unit 50 may be configured not to receive an operation on the enlargement/reduction button 77 or 78 and an operation for moving the display range leftward/rightward or upward/downward, which will be described below.

In step S320, the system control unit 50 determines whether the shutter button 61 is fully pressed and SW2 is turned on. If SW2 is turned on (YES in step S320), the processing proceeds to step S324. If not (NO in step S320), the processing proceeds to step S321. In step S324, the system control unit 50 performs the above-described imaging processing (series of imaging processing operations from reading the signal from the imaging unit 22 to writing the image file into the recording medium 200) in response to SW2 being turned on. The imaging range at this time is not a display range of the 2-area enlargement but is the entire imaging range. If the quick review is set to ON, the system control unit 50 automatically displays the newly captured image on the display unit 28 for the predetermined time period after the imaging processing, thereby allowing the user to confirm the imaging. After the imaging processing is ended, the processing returns to step S301. In step S321, the system control unit 50 determines whether the shutter button 61 is kept in the half-pressed state (SW1 is kept in the ON state). If SW1 is kept turned on (YES in step S321), the processing proceeds to step S319 and the system control unit 50 continues the 2-area enlargement display. If SW1 is not kept turned on, i.e., the shutter button 61 is released from the half-pressed state (NO in step S321), in step S322, the system control unit 50 ends the 2-area enlargement display and the processing returns to step S301.

Processing in steps S323 to S325 is similar to that in steps S314 to S316, and therefore a description thereof will be omitted here. However, if the system control unit 50 determines that SW1 is kept turned on in step S325 (YES in step S325), the processing returns to step S318 and loops until the timer has been fulfilled or SW2 is turned on.

Figure 4:
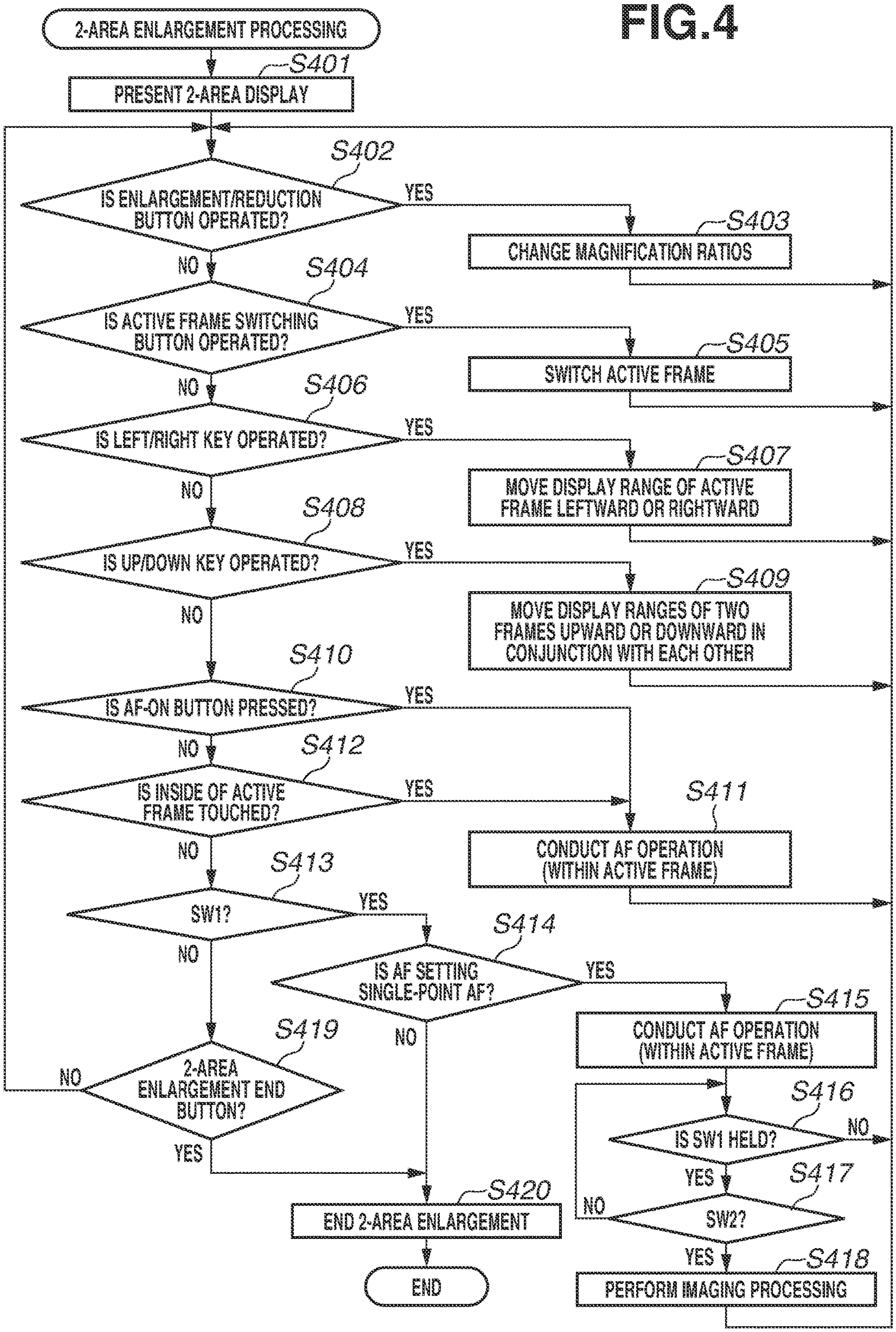
FIG. 4 is a flowchart illustrating 2-area enlargement processing.
Figure 5E:
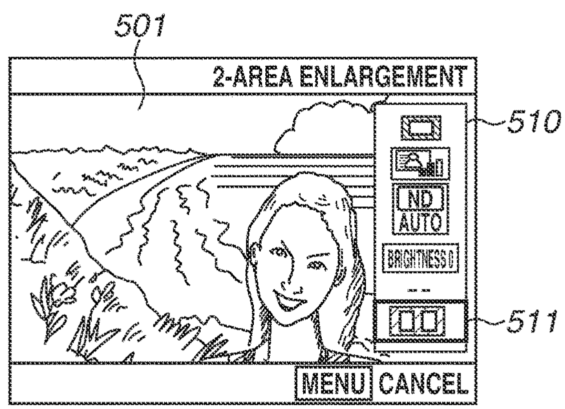

FIG. 4 is a flowchart illustrating the details of the 2-area enlargement processing performed in step S303 described above. The program recorded in the nonvolatile memory 56 is loaded into the system memory 52 and executed by the system control unit 50, by which this processing is realized.

Figure 6A:
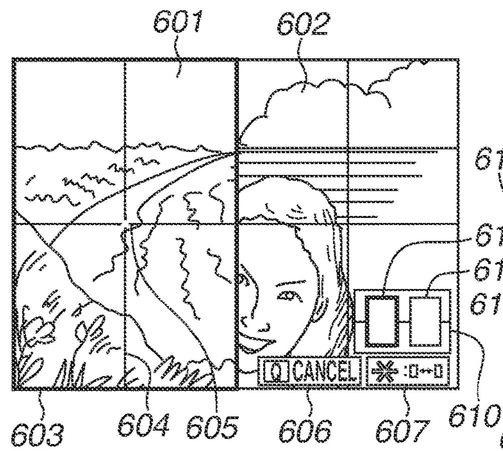
FIGS. 6A to 6F illustrate display examples in the 2-area enlargement processing.

In step S401, the system control unit 50 presents the 2-area enlargement display on the display unit 28. FIG. 6A illustrates a display example of the 2-area enlargement display. In the 2-area enlargement, the live view images of the two regions separated in the left/right direction (horizontal direction) or the up/down direction (vertical direction) are displayed in a state of being arranged on one screen. FIG. 6A illustrates an example in which live view images of two regions separated in the left/right direction are displayed in a state of being arranged on one screen. The left-side region 601 is a display region displaying a live view image captured by a partial region on a left side of the imaging unit 22. The right-side region 602 is a display region displaying a live view image captured by a partial region on a right side of the imaging unit 22. The live view images displayed in the left-side region 601 and the right-side region 602 are regions of the imaging unit 22 that are located at the same height. An active frame 603 is a selection frame indicating one of the left-side region 601 and the right-side region 602 that is a region currently targeted for an operation (active region). In FIG. 6A, the active frame 603 is placed on the left-side region 601, and the left-side region 601 is targeted for a leftward or rightward movement, the AF operation, and the like. An assist line 604 is an assist line displayed along each of a center of the left-side region 601 in the left/right direction and a center of the left-side region 601 in the up/down direction, and an intersection point therebetween coincides with a center of the left-side region 601. An assist line along each of a center in the up/down direction and a center in the left/right direction is also displayed in the right-side region 602 in a similar manner. A central marker 605 is a marker displayed on the active frame side, and indicates the center of the left-side region 601 with the active frame 603 placed thereon. Both the assist line 604 and the central marker 605 are not displayed at the central portion of the active frame 603, thereby allowing the user to confirm the subject located at the center. A guide 606 is a guidance display indicating an operation member (operation method) for ending the 2-area enlargement. A guide 607 is a guidance display indicating an operation member (operation method) for switching the active frame 603. An enlarged position guide 610 is a guide indicating portions displayed in an enlarged manner in the left-side region 601 and the right-side region 602 in the entire imaging range (entire live view image being captured by the imaging unit 22 or the entire imaging range contained in the still image to be captured in response to the imaging instruction). In other words, the enlarged position guide 610 is a guide indicating positions and sizes of two imaging regions corresponding to the left-side region 601 and the right-side region 602 with respect to the entire imaging range. A left-side indicator 611 indicates a range of the live view image that is displayed in the left-side region 601 with respect to the entire imaging range. A right-side indicator 612 indicates a range of the live view image that is displayed in the right-side region 602 with respect to the entire imaging range. As understood from the placement of the active frame 603 on the left-side region 601, the left-side indicator 611 is displayed in a different color or with a different line width from the right-side indicator 612. The guide 606, the guide 607, and the enlarged position guide 610 are displayed in a superimposed manner on the live view image in the region without the active frame 603 placed thereon (inactive frame) so as not to impede visual confirmation of the live view image in the region with the active frame 603 placed thereon.

In step S402, the system control unit 50 determines whether the enlargement button 77 is pressed or the reduction button 78 is pressed (enlargement/reduction instruction). If the enlargement button 77 is pressed or the reduction button 78 is pressed (YES in step S402), the processing proceeds to step S403. If not (NO in step S402), the processing proceeds to step S404.

Figure 6D:
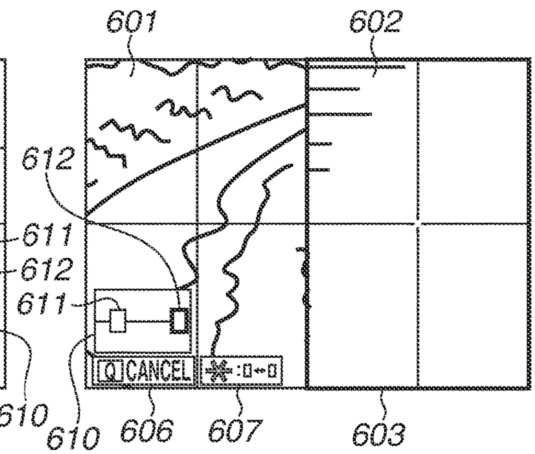
Figure 6B:
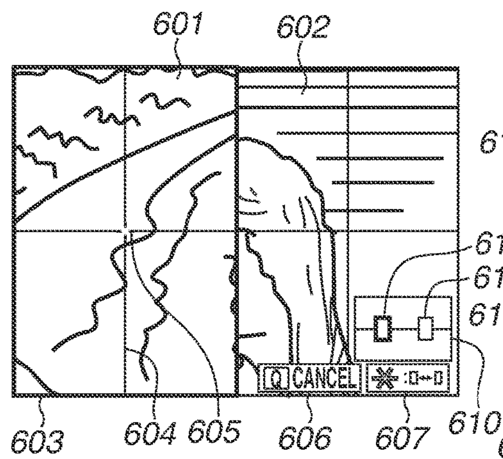

In step S403, the system control unit 50 changes magnification ratios of the LV images subjected to the 2-area enlargement according to the operation. If the enlargement button 77 is pressed, the system control unit 50 enlarges each of the LV images displayed in the left-side region 601 and the right-side region 602 so as to display it at a higher magnification ratio than a magnification ratio before the operation, and uses the same enlargement ratio for them i.e., enlarges the LV images on the left side and the right side in conjunction with each other. If the reduction button 78 is pressed, the system control unit 50 reduces each of the LV images displayed in the left-side region 601 and the right-side region 602 so as to display it at a lower magnification ratio than the magnification ratio before the operation, and uses the same enlargement ratio for them. The changed enlargement ratios are recorded into the system memory 52, and, even when the 2-area enlargement is temporarily ended, the display is started from the same enlargement ratios if the 2-area enlargement display is presented again without the digital camera 100 powered off. FIG. 6B illustrates a display example when the enlargement button 77 is pressed and the live view images are enlarged from the state illustrated in FIG. 6A. The live view images displayed in the left-side region 601 and the right-side region 602 are each enlarged in FIG. 6B more than in FIG. 6A. Further, the enlargement leads to a display of a narrower range in the entire imaging range, thereby leading to a smaller size of each of the left-side indicator 611 and the right-side indicator 612 displayed in the enlarged position guide 610 in FIG. 6B than in FIG. 6A.

In step S404, the system control unit 50 determines whether the active frame switching button 70*d* is pressed. If the active frame switching button 70*d* is pressed (YES in step S404), the processing proceeds to step S405. If not (NO in step S404), the processing proceeds to step S406.

Figure 6E:
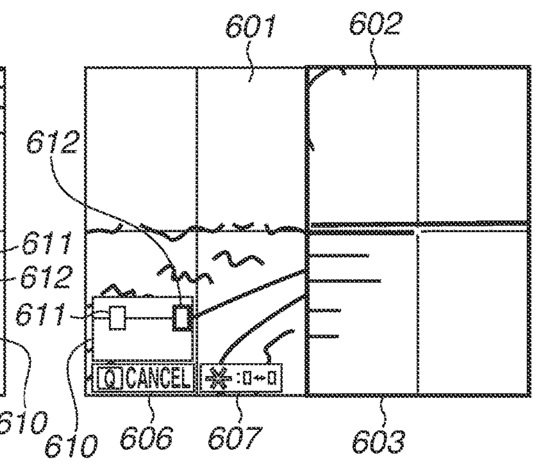
Figure 6C:
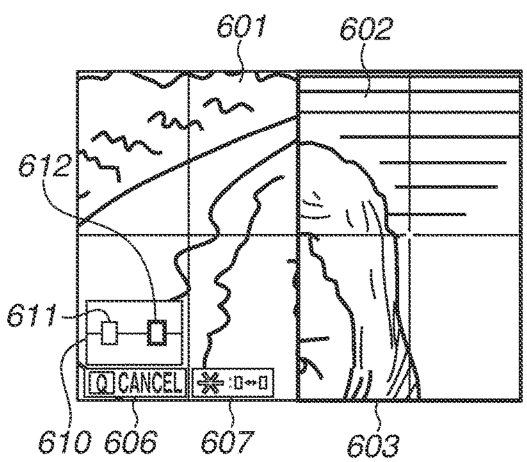

In step S405, the system control unit 50 moves the active frame 603 from the region with the active frame 603 placed thereon before the operation to the other region. FIG. 6C illustrates a display example when the active frame switching button 70*d* is pressed and the active frame 603 is moved from the state illustrated in FIG. 6B. The active frame 603 placed on the left-side region 601 in FIG. 6B is switched to the right-side region 602 in FIG. 6C. Further, the guide 606, the guide 607, and the enlarged position guide 610 are moved to positions superimposed on the left-side region 601 now set as the inactive frame.

In step S406, the system control unit 50 determines whether the left/right key in the cross key 74 is operated. If the left/right key is operated (YES in step S406), the processing proceeds to step S407. If not (NO in step S406), the processing proceeds to step S408.

In step S407, the system control unit 50 moves the display range in the region with the active frame 603 placed thereon leftward or rightward according to the operation on the left/right key. More specifically, the system control unit 50 moves the display range in the region with the active frame 603 placed thereon leftward if the left button is pressed, and moves the display range in the region with the active frame 603 placed thereon rightward if the right button is pressed. FIG. 6D illustrates a display example when the right button is pressed several times from the state illustrated in FIG. 6C. The enlarged region displayed in the right-side region 602 with the active frame 603 placed thereon is moved rightward in the imaging range in FIG. 6D more than in FIG. 6C. As a result, the video image itself is scrolled from the right to the left. At this time, the display range in the left-side region 601 set as the inactive frame is not changed, i.e., the image is moved leftward or rightward in a disconnected manner when the left and right regions are out of contact with each other. In the enlarged position guide 610, the right-side indicator 612 is moved rightward in FIG. 6D more than in FIG. 6C so as to indicate that the display range in the right-side region 602 is moved further rightward. The changed display range (display position) is recorded into the system memory 52, and, even when the 2-area enlargement is temporarily ended, the same display range is displayed as the 2-area enlargement display if the 2-area enlargement display is presented again without the digital camera 100 powered off. If a right edge of the display range in the left-side region 601 is in contact with a left edge of the display range in the right-side region 602, both the display ranges in the left-side region 601 and the right-side region 602 are moved rightward in conjunction with each other according to the instruction for the further rightward movement even when the active frame 603 is placed on the left-side region 601. However, when the right-side region 602 reaches a right edge of the entire imaging range, the display ranges cannot be moved further rightward and therefore are not moved even when the instruction for the further rightward movement is issued. On the other hand, if the left edge of the display range in the right-side region 602 is in contact with the right edge of the display range in the left-side region 601, both the display ranges in the left-side region 601 and the right-side region 602 are moved leftward in conjunction with each other according to an instruction for a further leftward movement even when the active frame 603 is placed on the right-side region 602. However, when the left-side region 601 reaches a left edge of the entire imaging range, the display ranges cannot be moved further leftward and therefore are not moved even when the instruction for the further leftward movement is issued.

In step S408, the system control unit 50 determines whether the up/down key in the cross key 74 is operated. If the up/down key is operated (YES in step S408), the processing proceeds to step S409. If not (NO in step S408), the processing proceeds to step S410.

In step S409, the system control unit 50 moves the display ranges in the left-side region 601 and the right-side region 602 upward or downward in conjunction with each other according to the operation on the up/down key. More specifically, the system control unit 50 moves the display ranges in the left-side region 601 and the right-side region 602 upward in conjunction with each other if the up button is pressed, and moves the display ranges in the left-side region 601 and the right-side region 602 downward in conjunction with each other if the down button is pressed. FIG. 6E illustrates a display example when the up button is pressed several times from the state illustrated in FIG. 6D. The display range in each of the left-side region 601 and the right-side region 602 is moved upward in the imaging range in FIG. 6E more than in FIG. 6D. As a result, the video image itself is scrolled from the top to the bottom. In the enlarged position guide 610, the left-side indicator 611 and the right-side indicator 612 are moved upward in FIG. 6E more than in FIG. 6D so as to indicate that the display ranges in the left-side region 601 and the right-side region 602 are moved further upward. The changed display ranges (display positions) are recorded into the system memory 52, and, even when the 2-area enlargement is temporarily ended, the same display ranges are displayed as the 2-area enlargement display if the 2-area enlargement display is presented again without the digital camera 100 powered off.

Figure 6F:
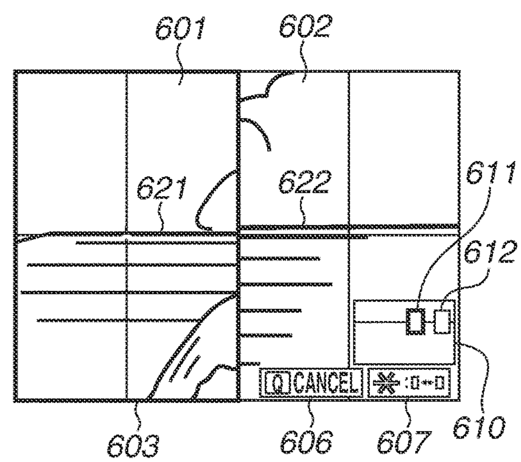

The user can capture an image in which a line of the subject appears to extend horizontally by repeating the operation like the above-described example to set the display ranges in the 2-area enlargement to separated two positions on a horizon, a horizontal line, a transverse outline of a building, or the like, adjust the orientation of the camera 100 in such a manner that lines of the subject in the left and right regions are in alignment with each other, and then capture the image. FIG. 6F illustrates a display example when, in the 2-area enlargement display, the left-side region 601 is set to a subject portion including a horizontal line 621, and the right-side region 602 is set to a subject portion including a horizontal line 622 at a position separated from the horizontal line 621. The horizontal line is supposed to be a straight line under normal circumstances, but, in the example illustrated in FIG. 6F, the horizontal line 621 displayed in the left-side region 601 and the horizontal line 622 displayed in the right-side region 602 do not appear to be a connected straight line and are slightly out of alignment with each other. The user can be aware that the digital camera 100 is not held horizontally by viewing such a display. The user can acquire the image in which the horizontal line appears to extend horizontally by capturing the image after adjusting the orientation of the digital camera 100 into such an orientation that the user can visually confirm the horizontal line 621 and the horizontal line 622 as one straight line.

In step S410, the system control unit 50 determines whether the AF-ON button 70*b* is pressed. If the AF-ON button 70*b* is pressed (YES in step S410), the processing proceeds to step S411. If not (NO in step S410), the processing proceeds to step S412.

In step S411, the system control unit 50 conducts the AF operation with respect to the central portion (position indicated by the central marker 605) in the active frame 603 while maintaining the 2-area enlargement display. Since the digital camera 100 is in the middle of the LV imaging, the system control unit 50 conducts the AF operation according to the contrast AF or the phase difference AF on the image sensor plane. This operation allows the digital camera 100 to focus on the subject in the active frame 603, thereby facilitating visual confirmation of an edge portion of the subject. Therefore, this operation facilitates such confirmation that the user brings the lines of the subject in the left and right regions into alignment with each other like the above-described example. This AF operation is not the AF operation according to the imaging preparation instruction but is AF operation for facilitating the visual confirmation of the 2-area enlargement display.

In step S412, the system control unit 50 determines whether the LV region in the active frame 603 is touched (whether the Touch-Down is performed thereon). If the Touch-Down is performed onto the region in the active frame 603 (YES in step S412), the processing proceeds to step S411. If not (NO in step S412), the processing proceeds to step S413. If the system control unit 50 determines that the inside of the active frame 603 is touched in step S412 (YES in step S412), in step S411, the system control unit 50 conducts the AF operation while maintaining the 2-area enlargement display. The position on which the AF is conducted is assumed to be the central portion (position indicated by the central marker 605) in the active frame 603, but the system control unit 50 may operate so as to conduct the AF operation according to the subject located at a touched position in the active frame 603. Further, in the present exemplary embodiment, the digital camera 100 has been described as conducting the AF operation if the inside of the active frame 603 is touched, but may be configured to conduct the AF operation while maintaining the 2-area enlargement if the inside of the inactive frame is touched. At this time, the system control unit 50 may switch the active frame 603 to the touched region.

In step S413, the system control unit 50 determines whether the shutter button 61 is half pressed and SW1 is turned on. If SW1 is turned on (YES in step S413), the processing proceeds to step S414. If not (NO in step S413), the processing proceeds to step S419.

In step S414, the system control unit 50 refers to the setting information stored in the system memory 52 or the nonvolatile memory 56, and determines whether the setting of the AF method set in step S305 is the single-point method (single-point AF). If the setting of the AF method is the single-point method (YES in step S414), the processing proceeds to step S415. If not (NO in step S414), the processing proceeds to step S420. In step S415, the system control unit 50 conducts the AF operation with respect to the central portion (position indicated by the central marker 605) in the active frame 603 without ending the 2-area enlargement. After the digital camera 100 is focused as a result of the AF operation, the focus is fixed (AF lock) while SW1 is kept turned on.

In step S416, the system control unit 50 determines whether SW1 is kept turned on. If SW1 is kept turned on (YES in step S416), the processing proceeds to step S417. If not (NO in step S416), the AF lock state is released and the processing proceeds to step S402.

In step S417, the system control unit 50 determines whether the shutter button 61 is fully pressed and SW2 is turned on. If SW2 is turned on (YES in step S417), the processing proceeds to step S418. If not (NO in step S417), the processing proceeds to step S416.

In step S418, the system control unit 50 performs the above-described imaging processing (series of imaging processing operations from reading the signal from the imaging unit 22 to writing the image file into the recording medium 200). The image captured by the imaging processing is not an image of the range subjected to the 2-area enlargement display but is an image of the imaging range. After the imaging processing is ended, the processing returns to step S402. After the imaging processing is ended, the system control unit 50 may end the 2-area enlargement and return to the live view display of the entire imaging range (display the image at the same magnification ratio, display the image at the normal magnification ratio) without the processing returning to step S402, i.e., the processing may proceed to step S301.

In step S419, the system control unit 50 determines whether a button for ending the 2-area enlargement is pressed. The button for ending the 2-area enlargement is the Q button 70*c* in the present exemplary embodiment. If the Q button 70*c* is pressed (YES in step S419), the processing proceeds to step S420. If not (NO in step S419), the processing returns to step S402 and is repeated.

In step S420, the system control unit 50 ends the 2-area enlargement display and returns the display to the overall display of the live view image, thereby ending the 2-area enlargement processing. The processing proceeds to step S301 illustrated in FIG. 3, and the live view image is entirely displayed.

Figure 5C:
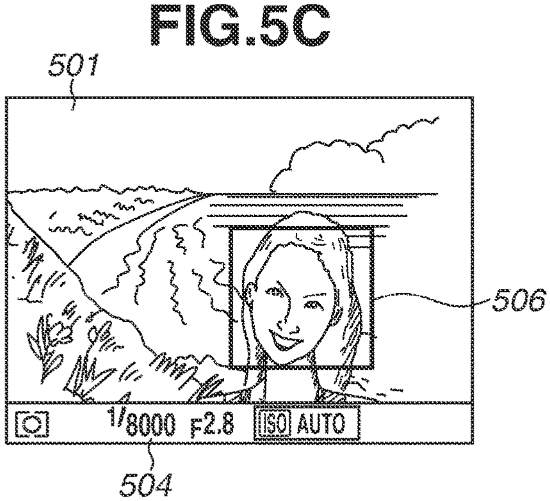

If the setting of the AF method is not the single-point AF (i.e., the setting of the AF method is any of the Ai-AF method, the face AF, and the zone AF) in step S414 (NO in step S414), in step S420, the system control unit 50 ends the 2-area enlargement. Then, the processing proceeds to step S301 illustrated in FIG. 3, and the system control unit 50 presents the overall display of the live view. Further, the system control unit 50 conducts the AF operation according to the set AF method because SW1 is determined to be turned on in step S308 (YES in step S308). Then, in step S312, the system control unit 50 displays a result of the AF operation. If SW2 is turned on in this state, in step S315 or S324, the system control unit 50 captures the image. With this operation, for example, when the AF method is set to the face AF, the image is displayed in the state illustrated in FIG. 5C when the shutter button 61 is half pressed while the 2-area enlargement display is presented as illustrated in FIG. 6F and the camera orientation is adjusted horizontally with the horizontal line 621 and the horizontal line 622 in alignment with each other. The face is not in focus by the AF operation when the AF operation is conducted inside the display range displayed in FIG. 6F because the face is not contained in the display range, but, according to the present exemplary embodiment, the face is in focus by the AF operation as illustrated in FIG. 5C. Further, the user can capture the image at an imaging timing according to the face that is the main subject by, for example, capturing the image while viewing an expression or the like on the face displayed in the entire live view and fully pressing the shutter button 61 at a timing when the subject smiles. In this manner, if the AF method set by the user is not the single-point AF (if the AF method set by the user is any of the Ai-AF method, the face AF, and the zone AF), the main subject desired to be focused on by the AF operation may be absent in the display range (may be located outside the display range) displayed in the 2-area enlargement. Therefore, when the imaging preparation instruction is issued during the 2-area enlargement display, the digital camera 100 ends the 2-area enlargement, and conducts the AF operation according to the set AF method in a range independent of the display range in the 2-area enlargement. As a result, the digital camera 100 can capture the image while being focused on the subject desired by the user even when presenting the 2-area enlargement display.

The end of the 2-area enlargement according to the imaging preparation instruction is effective especially when the image is captured while the digital camera 100 is fixed with use of a tripod or the like. In the case where the tripod or the like is used, once the user fixes the digital camera 100 after establishing the horizontality while viewing the 2-area enlargement display, the orientation of the camera 100 is fixed in the horizontal state after that. Therefore, the merit of the user by viewing the 2-area enlargement display until immediately before the imaging is little, and it is more desirable to end the 2-area enlargement as described above to allow the user to find an optimum imaging timing while viewing the overall live view.

The digital camera 100 may be configured in such a manner that, if the system control unit 50 determines NO in step S414 (NO in step S414), the system control unit 50 determines whether the digital camera 100 is fixed, and the processing proceeds to step S420 if the digital camera 100 is fixed while the processing proceeds to step S415 in which the system control unit 50 conducts the AF operation without ending the 2-area enlargement if the digital camera 100 is not fixed (e.g., handheld imaging). Whether the digital camera 100 is fixed (whether the digital camera 100 is stationary) can be detected by the orientation detection unit 55. Alternatively, the digital camera 100 can also be determined to be fixed if mounting (connection) of fixation equipment is detected by a sensor (not illustrated) such as a detection switch that detects whether the fixation equipment for fixing the camera 100 such as the tripod is mounted (connected).

On the other hand, if the AF method is the single-point AF, the main subject is highly likely to be an unmoving stationary subject. The digital camera 100 is configured assuming that the user would capture the image while maintaining the 2-area enlargement because it is less necessary to confirm how the main subject looks like immediately before the imaging in this case. Due to this configuration, the user can capture the image while confirming whether the horizontality is established in the 2-area enlargement until immediately before the imaging. In the case of the single-point AF, the AF operation according to the imaging preparation instruction is conducted without ending the 2-area enlargement, but may be conducted on the AF position set when the overall live view display has been presented regardless of whether the position on which the AF operation is conducted is located within the display range of the 2-area enlargement.

The digital camera 100 may be configured in such a manner that the processing proceeds to step S420 if SW1 is turned on without the processing in step S414 being performed. In other words, the digital camera 100 may be configured to conduct the AF operation after ending the 2-area enlargement if the shutter button 61 is half pressed, regardless of the set AF method. According to the present exemplary embodiment, the digital camera 100 conducts the AF operation after ending the 2-area enlargement if the imaging preparation instruction is issued by half pressing the shutter button 61 (second operation member). On the other hand, the digital camera 100 conducts the AF operation while maintaining the 2-area enlargement if the AF instruction operation is performed on the AF-ON button 70*b* or the touch panel 70*a* (first operation member). In this manner, the user can selectively employ whether to conduct the AF operation while maintaining the 2-area enlargement or conduct the AF operation after ending the 2-area enlargement according to the operation member (or operation method) with which the AF instruction is issued.

Further, the digital camera 100 may be configured in such a manner that the system control unit 50 determines whether the digital camera 100 is fixed instead of the processing in step S414, and the processing proceeds to step S420 if the digital camera 100 is fixed while the processing proceeds to step S415 in which the system control unit 50 conducts the AF operation without ending the 2-area enlargement if the digital camera 100 is not fixed (e.g., handheld imaging). In other words, the digital camera 100 may switch whether to end the 2-area enlargement according to whether the digital camera 100 is fixed, regardless of the set AF method.

According to the processing in step S319 illustrated in FIG. 3 described above, the 2-area enlargement display is automatically presented when the shutter button 61 is kept half pressed for the predetermined time period after being half pressed to trigger the AF operation, even without the 2-area enlargement display being presented. When the shutter button 61 is fully pressed in this state, the image is captured. Therefore, the user can establish the horizontality and capture the image with the shutter button kept half pressed and the 2-area enlargement display automatically presented, after half pressing the shutter button 61 to conduct the AF operation and confirming the focus state in the overall LV display after the end (execution) of the AF operation. This function is effective when the user is capturing the image while holding the digital camera 100 with the user's hand without use of the tripod. Holding the digital camera 100 with the hand makes it difficult to correctly hold the camera 100 horizontally until capturing the image even if the orientation of the digital camera 100 is first adjusted into the horizontal orientation, and highly likely leads to horizontal misalignment. To solve such a problem, according to the processing in step S319, the user can issue the imaging instruction (fully press the shutter button 61) after the 2-area enlargement display is automatically presented, and therefore can capture the image with the horizontality established in the 2-area enlargement display.

The digital camera 100 has been described referring to the example in which the processing proceeds to step S317 and the system control unit 50 automatically presents the 2-area enlargement display if the setting of the automatic 2-area enlargement display is set to ON in step S313 (YES in step S313). However, instead thereof (instead of the processing in step S313), the digital camera 100 may be configured in such a manner that the system control unit 50 determines whether the digital camera 100 is fixed, and the processing proceeds to step S317 and the system control unit 50 automatically presents the 2-area enlargement display if the digital camera 100 is not fixed while the processing proceeds to step S314 if the digital camera 100 is fixed.

Further, the digital camera 100 may be configured to prepare a setting value representing an automatic setting in addition to ON and OFF as the setting of the automatic 2-area enlargement display, and add a determination about whether the digital camera 100 is fixed if the setting of the automatic 2-area enlargement display is set to the automatic setting in addition to the processing in step S313. More specifically, in step S313, the system control unit 50 determines whether the setting of the automatic 2-area enlargement display is set to ON. If the setting of the automatic 2-area enlargement display is set to ON (YES in step S313), the processing proceeds to step S317. If the setting of the automatic 2-area enlargement display is not set to ON (if the setting of the automatic 2-area enlargement display is set to the automatic setting or OFF) (NO in step S313), the system control unit 50 determines whether the setting of the automatic 2-area enlargement display is set to the automatic setting. If the setting of the automatic 2-area enlargement display is not set to the automatic setting (i.e., if the setting of the automatic 2-area enlargement display is set to OFF), the processing proceeds to step S314. If the setting of the automatic 2-area enlargement display is set to the automatic setting, the processing proceeds to the determination about whether the digital camera 100 is fixed. If the system control unit 50 determines that the digital camera 100 is fixed, the processing proceeds to step S314 and the system control unit 50 does not automatically present the 2-area enlargement display. If the system control unit 50 determines that the digital camera 100 is not fixed, the processing proceeds to step S317 and the system control unit 50 automatically presents the 2-area enlargement display after that.

Further, the digital camera 100 has been described referring to the example in which the system control unit 50 automatically presents the 2-area enlargement display when the shutter button 61 is kept half pressed for the predetermined time period, but may be configured in such a manner that the system control unit 50 automatically presents the 2-area enlargement display according to a condition other than the time period. For example, the system control unit 50 may present the 2-area enlargement display without waiting for the predetermined time period assuming that, if an edge portion on a straight line extending in the left/right direction is detected from the LV image after the AF operation conducted according to the half-press of the shutter button 61, this is a subject useful to establish the horizontality in the 2-area enlargement of, for example, the edge of the horizontal line or the building. Further, if the imaging mode is set to such an imaging mode that holding the camera 100 horizontally is recommended, such as a scenery mode and a skyrocket mode, the system control unit 50 may present the 2-area enlargement display without waiting for the predetermined time period after the AF.

Regarding the above-described various kinds of control that have been described assuming that the system control unit 50 performs them, a single hardware device may perform them, or a plurality of hardware devices may control the entire apparatus by dividing the processing among them.

Further, although the present disclosure has been described in detail based on the representative exemplary embodiments thereof, the present disclosure is not limited thereto, and includes various embodiments within a range that does not depart from the spirit of the present disclosure. Further, each of the above-described exemplary embodiments merely indicates one exemplary embodiment of the present disclosure, and the individual exemplary embodiments can also be combined arbitrarily.

Further, the above-described exemplary embodiments have been described referring to the example in which the present disclosure is applied to the digital camera 100, but the present disclosure is not limited to this example and can be applied to any imaging control apparatus capable of presenting the 2-area enlargement display. More specifically, the present disclosure can be applied to a personal computer and a personal digital assistant (PDA) having a camera function, a mobile phone terminal equipped with a camera and a mobile image viewer equipped with a camera, a music player equipped with a camera, a game machine equipped with a camera, and an electronic book reader equipped with a camera. Further, the present disclosure can be applied to a tablet terminal equipped with a camera, a smart-phone equipped with a camera, home electronics and an in-vehicle apparatus including a camera function and a display, and the like. Further, the present disclosure can also be applied to apparatuses such as a smart-phone, a tablet personal computer (PC), and a desktop PC that receive a live view image captured by a digital camera or the like via wired or wireless communication to display the received live view image, and remotely control the digital camera (including a network camera).

According to the above-described exemplary embodiments, the user can capture an image of a main subject after enlarging 2-areas and adjusting the horizontal orientation.

Other Embodiment

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-254225, filed Dec. 27, 2016, which is hereby incorporated by reference herein in its entirety.

What is claimed is:

1. An imaging control apparatus comprising:

at least one memory and at least one processor which function as:

a display control unit configured to perform control to present a 2-area enlargement display of displaying live view images captured at two imaging regions in an imaging unit that are separately arranged in a width direction or a height direction on a display unit;

a setting unit configured to set an autofocus method;

a control unit configured to perform control to conduct, in response to an autofocus instruction operation on a first operation unit, an autofocus operation inside of a range displayed in the 2-area enlargement display while maintaining the 2-area enlargement display in a state where the 2-area enlargement display is presented, and to end, in response to an autofocus instruction operation on a second operation unit, the 2-area enlargement display and conduct the autofocus operation in a range independent of the inside of the range displayed in the 2-area enlargement display in a state where the 2-area enlargement display is presented, wherein the control unit performs control to end the 2-area enlargement display and conduct the autofocus operation in the range independent of the inside of the range displayed in the 2-area enlargement display in response to the autofocus instruction operation on the second operation unit in a state where the 2-area enlargement display is presented when a first autofocus method is set by the setting unit, and wherein the control unit performs control to conduct the autofocus inside the range displayed in the 2-area enlargement display while maintaining the 2-area enlargement display in response to the autofocus instruction operation on the second operation unit when a second autofocus method is set by the setting unit.

2. The imaging control apparatus according to claim 1, wherein the first operation unit is an operation member different from a shutter button usable to issue an imaging instruction to instruct the imaging control apparatus to capture an image by an imaging unit, and wherein the second operation unit is the shutter button usable to issue the imaging instruction to instruct the imaging unit to capture the image.

3. The imaging control apparatus according to claim 1, wherein the control unit performs control to capture an image by an imaging unit in response to an imaging instruction operation on the second operation unit that is performed subsequently to the autofocus instruction operation on the second operation unit.

4. The imaging control apparatus according to claim 1, wherein the first operation unit is a touch panel configured to detect a touch operation onto the display unit.

5. The imaging control apparatus according to claim 1, wherein the first autofocus method is a method that conducts the autofocus operation with respect to a detected face when the face is detected.

6. The imaging control apparatus according to claim 1, wherein the second autofocus method is a method that conducts the autofocus operation with respect to a single point.

7. The imaging control apparatus according to claim 1, wherein the at least one memory and at least one processor further function as a determination unit configured to determine whether the imaging control apparatus is fixed, and wherein the control unit performs control to conduct the autofocus operation inside the range displayed in the 2-area enlargement display while maintaining the 2-area enlargement display in response to the autofocus instruction operation regardless of the set autofocus method, when the determination unit does not determine that the imaging control apparatus is fixed.

8. An imaging control apparatus comprising:

at least one memory and at least one processor which function as:

a display control unit configured to perform control to present a 2-area enlargement display of displaying live view images captured at two imaging regions in an imaging unit that are separately arranged in a width direction or a height direction on a display unit;

a setting unit configured to set whether to enable or disable the 2-area enlargement display according to the satisfaction of a predetermined condition; and a control unit configured to perform control to perform imaging preparation processing in response to an input of a first operation on an imaging instruction unit in a case where the 2-area enlargement display is not presented, and capture an image in response to an input of a second operation on the imaging instruction unit, wherein the control unit performs control to present the 2-area enlargement display according to satisfaction of the predetermined condition while the first operation on the imaging instruction unit continues, and wherein the control unit performs control not to present the 2-area enlargement display when the predetermined condition is satisfied while the first operation continues, when the 2-area enlargement display is set to be disabled by the setting unit.

9. The imaging control apparatus according to claim 8, wherein the predetermined condition is an elapse of a predetermined time period.

10. The imaging control apparatus according to claim 8, wherein the control unit performs control to transition to the 2-area enlargement display after the imaging preparation processing is performed in response to the first operation, in a case where the 2-area enlargement display is presented according to the satisfaction of the predetermined condition.

11. The imaging control apparatus according to claim 10, wherein the imaging preparation processing includes an autofocus operation, and the control unit performs control to conduct an autofocus operation in response to the first operation and transition to the 2-area enlargement display after displaying a result of the execution of the autofocus operation when the 2-area enlargement display is presented according to the satisfaction of the predetermined condition.

12. An imaging control apparatus comprising:

at least one memory and at least one processor which function as:

a display control unit configured to perform control to present a 2-area enlargement display of displaying live view images captured at two imaging regions in an imaging unit that are separately arranged in a width direction or a height direction on a display unit;

a control unit configured to perform control to perform imaging preparation processing in response to an input of a first operation on an imaging instruction unit in a case where the 2-area enlargement display is not presented, and capture an image in response to an input of a second operation on the imaging instruction unit; and a determination unit configured to determine whether the imaging control apparatus is fixed, wherein the control unit performs control to present the 2-area enlargement display according to satisfaction of a predetermined condition while the first operation on the imaging instruction unit continues, and wherein the control unit performs control not to present the 2-area enlargement display when the predetermined condition is satisfied while the first operation continues, when the determination unit determines that the imaging control apparatus is fixed.

13. A method for controlling an imaging control apparatus, the method comprising:

performing control to present a 2-area enlargement display of displaying live view images captured at two imaging regions in an imaging unit that are separately arranged in a width direction or a height direction on a display unit;

setting an autofocus method; and performing control to conduct, in response to an autofocus instruction operation on a first operation unit, an autofocus operation inside a range displayed in the 2-area enlargement display while maintaining the 2-area enlargement display in a state where the 2-area enlargement display is presented, and to end, in response to an autofocus instruction operation on a second operation unit, the 2-area enlargement display and conduct the autofocus operation in a range independent of the inside of the range displayed in the 2-area enlargement display in a state where the 2-area enlargement display is presented, performing control to end the 2-area enlargement display and conduct the autofocus operation in the range independent of the inside of the range displayed in the 2-area enlargement display in response to the autofocus instruction operation on the second operation unit in a state where the 2-area enlargement display is presented when a first autofocus method is set, and performing control to conduct the autofocus inside the range displayed in the 2-area enlargement display while maintaining the 2-area enlargement display in response to the autofocus instruction operation on the second operation unit when a second autofocus method is set.

14. A non-transitory computer-readable storage medium storing a program for causing a computer to execute a method for controlling an imaging control apparatus according to claim 13.

15. A method for controlling an imaging control apparatus, the method comprising:

performing control to present a 2-area enlargement display of displaying live view images captured at two imaging regions in an imaging unit that are separately arranged in a width direction or a height direction on a display unit;

setting whether to enable or disable the 2-area enlargement display according to the satisfaction of a predetermined condition; and performing control to perform imaging preparation processing in response to an input of a first operation on an imaging instruction unit in a state where the 2-area enlargement display is not presented, and capture an image in response to an input of a second operation on the imaging instruction unit, wherein the 2-area enlargement display is performed in response to a satisfaction of a predetermined condition while the first operation on the imaging instruction unit continues, and performing control not to present the 2-area enlargement display when the predetermined condition is satisfied while the first operation continues, when the 2-area enlargement display is set to be disabled.

16. A non-transitory computer-readable storage medium storing a program for causing a computer to execute a method for controlling an imaging control apparatus according to claim 15.

17. An imaging control method comprising:

performing control to present a 2-area enlargement display of displaying live view images captured at two imaging regions in an imaging unit that are separately arranged in a width direction or a height direction on a display unit;

performing control to perform imaging preparation processing in response to an input of a first operation on an imaging instruction unit in a case where the 2-area enlargement display is not presented, and capture an image in response to an input of a second operation on the imaging instruction unit; and determining whether the imaging control apparatus is fixed, performing control to present the 2-area enlargement display according to satisfaction of a predetermined condition while the first operation on the imaging instruction unit continues, and performing control not to present the 2-area enlargement display when the predetermined condition is satisfied while the first operation continues, when it is determined that the imaging control apparatus is fixed.

18. A non-transitory computer-readable storage medium storing a program for causing a computer to execute an imaging control method according to claim 17.

* * * * *